(12) United States Patent
Tokiwa et al.

(10) Patent No.: US 7,783,182 B2
(45) Date of Patent: Aug. 24, 2010

(54) CAMERA SYSTEM, LENS UNIT AND ACCESSORY DEVICE

(75) Inventors: Kentaro Tokiwa, Saitama (JP); Yoshihiro Ito, Saitama (JP); Takeshi Misawa, Saitama (JP); Takehiko Senba, Saitama (JP); Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/558,063

(22) Filed: Sep. 11, 2009

(65) Prior Publication Data
US 2010/0008660 A1 Jan. 14, 2010

Related U.S. Application Data

(62) Division of application No. 11/472,326, filed on Jun. 22, 2006, now Pat. No. 7,609,953.

(30) Foreign Application Priority Data
Jun. 22, 2005 (JP) .............................. 2005-181526

(51) Int. Cl.
*G03B 17/56* (2006.01)
(52) U.S. Cl. ......................................... 396/71; 348/375
(58) Field of Classification Search .................... 396/71; 348/375
See application file for complete search history.

(56) References Cited

U.S. PATENT DOCUMENTS

| 5,548,369 | A | 8/1996 | Iijima |
| 6,707,992 | B2 | 3/2004 | Uenaka et al. |
| 6,738,574 | B2 | 5/2004 | Nishida et al. |
| 2006/0023070 | A1 | 2/2006 | Nakamura et al. |

| 2006/0098114 | A1* | 5/2006 | Horii .......................... 348/360 |

FOREIGN PATENT DOCUMENTS

| JP | 4273227 A | 9/1992 |
| JP | 6-27515 | 2/1994 |
| JP | 8286089 A | 11/1996 |
| JP | 10213833 A | 8/1998 |

(Continued)

OTHER PUBLICATIONS

Japanese Office Action corresponding to Japanese Patent Application No. 2005-181526 dated Jun. 2, 2010.

*Primary Examiner*—Christopher E Mahoney
*Assistant Examiner*—Fang-Chi Chang
(74) *Attorney, Agent, or Firm*—Sughrue Mion, PLLC

(57) ABSTRACT

A lens unit has a photographing lens, and is secured removably to a camera main body. An accessory conversion lens device is settable on the lens unit. The lens unit includes a reception unit for receiving accessory device data from the conversion lens device. A determiner checks propriety of the conversion lens device according to accessory device data received by the reception unit, and produces checking information. A transmission unit transmits the checking information to the main body. Specifically, the lens unit has an image pickup element. Also, the conversion lens device includes an RFID tag for storing the accessory device data. The reception unit includes an RFID tag reader for wireless reception. Also, the main body includes an LCD panel to display for outputting alarm information. A main body controller drives the LCD panel if the checking information represents lack of the propriety.

12 Claims, 9 Drawing Sheets

FOREIGN PATENT DOCUMENTS

| | | |
|---|---|---|
| JP | 2002-72328 | 3/2002 |
| JP | 2002-258380 | 9/2002 |
| JP | 2003046818 A | 2/2003 |
| JP | 2003-228114 | 8/2003 |
| JP | 2004328202 A | 11/2004 |
| JP | 2004361898 A | 12/2004 |
| JP | 2005031438 A | 2/2005 |

* cited by examiner

CAMERA SYSTEM, LENS UNIT AND ACCESSORY DEVICE

This is a divisional of application Ser. No. 11/472,326 filed Jun. 22, 2006. The entire disclosure of the prior application, application Ser. No. 11/472,326 is considered part of the disclosure of the accompanying divisional application and is hereby incorporated by reference.

BACKGROUND OF THE INVENTION

1. Field of the Invention

The present invention relates to a camera system, lens unit and accessory device. More particularly, the present invention relates to a camera system in which a lens unit and other elements can be combined with ensured propriety, and such a lens unit and accessory device.

2. Description Related to the Prior Art

A camera system known in the art is a combination of a lens unit and a camera main body. The lens unit accommodates a photographing lens. The main body supports the lens unit removably. It is possible to load one of the main body and the lens unit with an accessory device, for example an electronic flash unit, a conversion lens device, and the like. It is known to mount the accessory device between the main body and the lens unit, for example a rear converter for changing a focal length or subject distance.

There occurs a change in the aperture stop or focal length between photographing with the accessory device and photographing without the accessory device, such as a conversion lens device and rear converter. If a type of the accessory device is not suitable for the lens unit or the camera main body, there occurs a problem in impropriety in the automatic exposure control or automatic focus adjustment.

JP-A 6-027515 and JP-A 2002-072328 disclose a camera system in which the lens unit has CPU, and the CPU, upon setting the accessory device between the lens unit and the camera main body, detects existence and type of the accessory device to supply the main body with type data of the accessory device by transmission. U.S. Pat. No. 6,707,992 (corresponding to JP-A 2002-258380) discloses a camera system in which a rear converter as the accessory device is settable between the lens unit and the main body. An intermediate communicating terminal is disposed in the rear converter for transmission between the lens unit and the main body. Type data of the rear converter is transmitted to the main body in transmitting type data of the lens unit to the main body. U.S. Pat. No. 6,738,574 (corresponding to JP-A 2003-228114) suggests a camera system in which a determiner is incorporated in the main body, and compares the accessory type data with the camera main body type data upon setting the accessory device on the main body, to check propriety between the main body and the accessory device.

In the constructions disclosed in those documents, type data of the accessory device and the lens unit are transmitted to the camera main body. The determiner in the main body checks propriety of the accessory device or the lens unit. If the main body does not have the determiner, propriety cannot be checked. No known camera system is successful in determining propriety of the accessory device of the lens unit.

SUMMARY OF THE INVENTION

In view of the foregoing problems, an object of the present invention is to provide a camera system in which a lens unit and other elements can be combined with ensured propriety, and such a lens unit and accessory device.

In order to achieve the above and other objects and advantages of this invention, a camera system is provided, including a lens unit having a photographing lens, and a camera main body on which the lens unit is secured removably, wherein an accessory device is settable on a selected one of the main body and the lens unit. In the camera system, the lens unit includes a first reception unit for receiving accessory device data from the accessory device. A determiner checks whether the accessory device is appropriate for the lens unit or the main body according to accessory device data received by the first reception unit, and produces checking information. A transmission unit transmits the checking information. The main body includes a second reception unit for receiving the checking information from the lens unit.

The accessory device data is accessory type data of a type of the accessory device.

The main body includes an alarm device for outputting alarm information. A main body controller drives the alarm device if the checking information represents that the accessory device is inappropriate.

The second reception unit is connected with the transmission unit by connection between contacts, and detects whether the lens unit is set on the main body.

The alarm device includes a display panel for visibly outputting the alarm information.

The first reception unit further receives camera main body data from the main body. The determiner checks whether a combination of the lens unit, the accessory device and the main body is appropriate.

The accessory device includes a first RFID tag for storing the accessory device data. The first reception unit includes an RFID tag reader for wireless reception.

The main body includes a second RFID tag for storing camera main body data. The RFID tag reader further reads the main body data from the second RFID tag.

The accessory device is a conversion lens device or a flash device.

In one aspect of the invention, a lens unit has a photographing lens, and is secured removably to a camera main body to constitute a camera system, wherein an accessory device is settable on the camera system. A reception unit receives accessory device data from the accessory device. A determiner checks whether the accessory device is appropriate for the camera system according to accessory device data received by the reception unit, and produces checking information. A transmission unit transmits the checking information to the main body.

Furthermore, an image pickup element photographs an object image by receiving light from the photographing lens.

The accessory device includes an RFID tag for storing the accessory device data. The reception unit includes an RFID tag reader for wireless reception.

In another aspect of the invention, a camera system includes a lens unit having a photographing lens, a camera main body on which the lens unit is secured removably, and an accessory device secured between the main body and the lens unit. In the camera system, the accessory device includes a first reception unit for receiving lens unit data from the lens unit. A determiner checks whether the lens unit is appropriate according to lens unit data received by the first reception unit, and produces checking information. A transmission unit transmits the checking information. The main body includes a second reception unit for receiving the checking information from the accessory device.

The main body includes an alarm device for outputting alarm information. A main body controller drives the alarm device if the checking information represents that the accessory device is inappropriate.

The second reception unit is connected with the transmission unit by connection between contacts, and detects whether the accessory device is set on the main body.

The alarm device includes a display panel for visibly outputting the alarm information.

The first reception unit further receives camera main body data from the main body. The determiner checks whether a combination of the lens unit, the accessory device and the main body is appropriate.

The accessory device includes a first RFID tag for storing the lens unit data. The first reception unit includes an RFID tag reader for wireless reception.

The main body includes a second RFID tag for storing camera main body data. The RFID tag reader further reads the main body data from the second RFID tag.

The lens unit includes a first communication contact. The accessory device includes a second communication contact, connected with the first communication contact by securing the lens unit, for detecting whether the lens unit is set.

The lens unit further includes an image pickup element for photographing an object image by receiving light from the photographing lens.

The accessory device is an image shake correcting device.

In still another aspect of the invention, an accessory device is secured between a camera main body and a lens unit having a photographing lens and being secured to the main body removably. A reception unit receives lens unit data from the lens unit. A determiner checks whether the lens unit is appropriate according to lens unit data received by the reception unit, and produces checking information. A transmission unit transmits the checking information to the main body.

The lens unit includes an RFID tag for storing the lens unit data. The reception unit includes an RFID tag reader for wireless reception.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
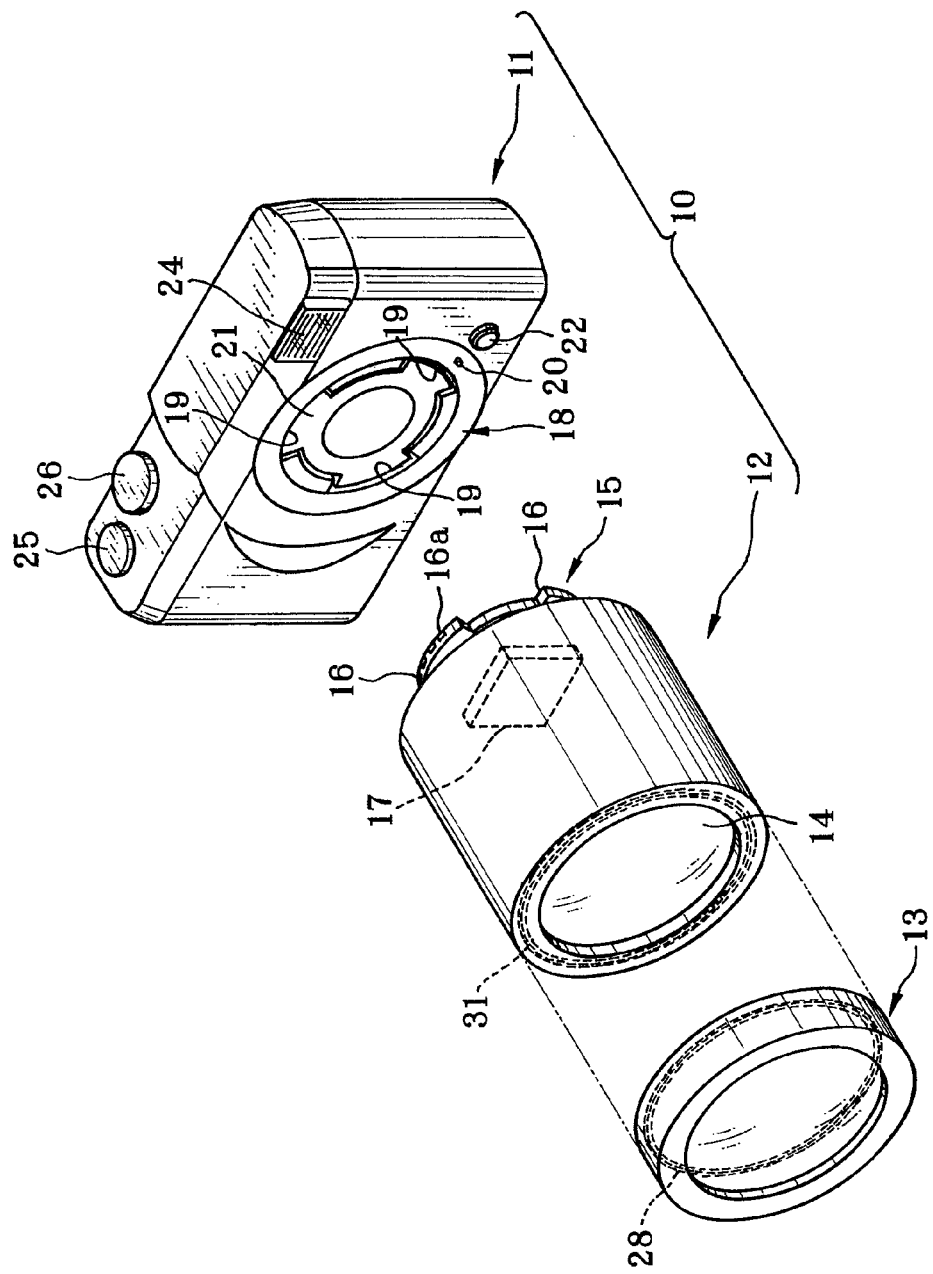
FIG. 1 is a perspective view illustrating a camera system.

In FIG. 1, a camera system 10 of the invention is illustrated. A camera main body 11 of the camera system 10 is loaded with a lens unit 12 in a removable manner. Also, a conversion lens device or converter 13 as accessory device or attachment is used in combination, and settable on the front of the lens unit 12.

A photographing lens 14 appears in the front of the lens unit 12. A lens unit coupling mechanism 15 is disposed on the rear of the lens unit 12. Bayonet lugs 16 are included in the lens unit coupling mechanism 15. Communication contacts 16a lie on the surface of the bayonet lugs 16 for connection. A CCD 17 as image pickup element is incorporated in the lens unit 12, and photographs an object image by receiving object light focused by the photographing lens 14.

A lens mount mechanism 18 is disposed on a front surface of the main body 11. Bayonet channels 19 are defined in the lens mount mechanism 18. To load the main body 11 with the lens unit 12, the bayonet lugs 16 are positioned in and pressed into the bayonet channels 19. The lens unit 12 is rotated in the clockwise direction and become fitted on the main body 11. Note that the lens unit 12 is an interchangeable type of lens, and selected from predetermined examples. The examples include a type with a different focal length of the photographing lens 14, a type with a different number of pixels of the CCD 17, a type for monochromatic photography, a type enabling infrared photography, and the like.

A lock pin 20 is disposed in the lens mount mechanism 18. When the main body 11 is loaded with the lens unit 12, a hole (not shown) formed in the lens unit coupling mechanism 15 receives the lock pin 20 to block rotation of the lens unit 12. The lens unit 12 is kept secured on the main body 11 without drop. Furthermore, a cover lid 21 is disposed on the lens mount mechanism 18 and biased in a forward direction with a spring, and prevents dust from entry in the main body 11 when the lens unit 12 is not loaded.

An unlocking button 22 is disposed near to the lens mount mechanism 18. When the unlocking button 22 is depressed while the lens unit 12 is set on the main body 11, then the lock pin 20 moves in the backward direction, to release from the hole. The lens unit 12 can be removed from the main body 11 by rotating the lens unit 12 and depressing the unlocking button 22.

A flash light source 24 is disposed near to the lens mount mechanism 18. A release button 25 and a selector wheel 26 are disposed on an upper surface of the main body 11. The release button 25 is depressible for photographing. The selector wheel 26 is rotationally shifted for setting a selected one of a photographing mode and a playback mode. A notifying LCD 33 as display panel and a power switch (not shown) are disposed on the rear of the main body 11.

An RFID tag or IC tag 50 (See FIG. 2) is incorporated in the conversion lens device 13, and stores information such as accessory type data. Also, an RFID tag coil 28 is included in the RFID tag 50, and disposed on the rear. An RFID tag reader 43 as first reception unit is included in the lens unit 12, and reads the accessory type data of a radio wave from the RFID tag 50. See FIG. 2. A tag reader coil 31 in the RFID tag reader 43 is disposed on the front.

Note that any of various types of the conversion lens device 13 may be used, for example a wide conversion lens for wide-angle photography, a telephoto conversion lens for telephoto photography, and a macro lens for close-up photography.

Figure 2:
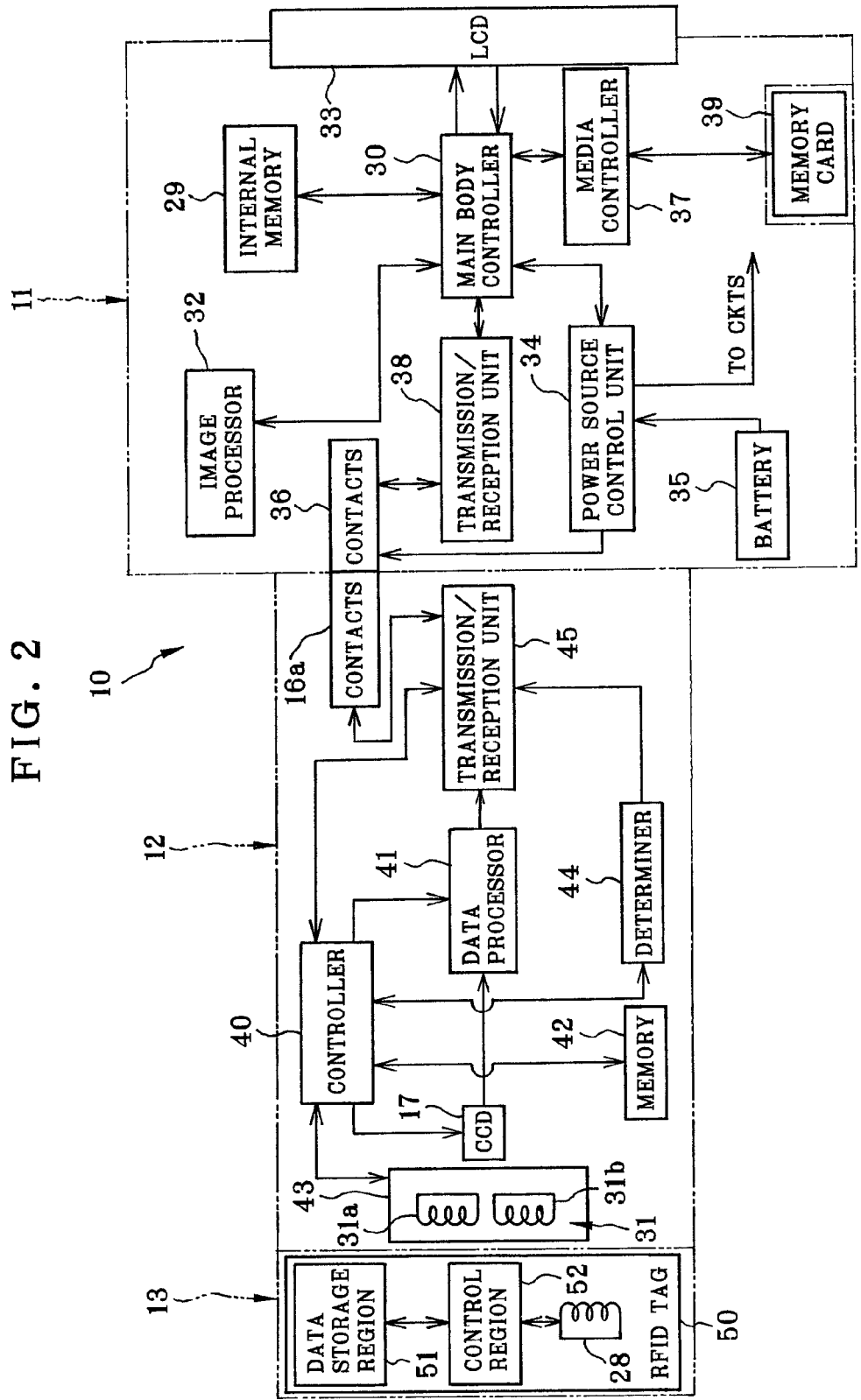
FIG. 2 is a block diagram illustrating the camera system

Arrangement of circuits in the camera system 10 is described now. In FIG. 2, the main body 11 includes a main body controller 30, an internal memory 29, an image processor 32, the LCD 33 as a display, a power source control unit 34, a battery 35, contacts 36, a media controller 37, and a transmission/reception unit 38 as second reception unit or communication interface.

The internal memory 29 includes a ROM and RAM. The ROM stores control program for controlling the elements in the main body 11 and the lens unit 12. The RAM stores data for tasks in a temporary manner. The main body controller 30 controls operation of photographing according to the control program.

The image processor 32 processes image data from the lens unit 12 according to various steps of image processing. The LCD 33 displays a recordable image and patterns for inputs, and also a live image. The power source control unit 34 is connected with the battery 35, supplies the circuits in the main body 11 with power by converting an output voltage of the battery 35 into a predetermined voltage, and also supplies the lens unit 12 with power through the contacts 16a and 36.

The contacts 36 are positioned in the lens mount mechanism 18, and become connected with the contacts 16a of the lens unit 12 upon setting the lens unit 12 on the lens mount mechanism 18. A memory card 39 is removably loaded in the main body 11, and accessed by the media controller 37 for reading and writing. The transmission/reception unit 38 is a serial driver, controlled by the main body controller 30, and transmits data to or receives data from the lens unit 12 by converting a parallel signal to a serial signal.

Arrangement of circuits in the lens unit 12 is described next. The lens unit 12 includes a controller 40, the CCD 17, a data processor 41, the contacts 16a, a memory 42, the RFID tag reader 43, a determiner 44, and a transmission/reception unit 45 or communication interface.

The controller 40 controls various elements in the lens unit 12. The CCD 17 photographs an object image by receiving object light focused by the photographing lens 14. The data processor 41 subjects image data from the CCD 17 to various processes, for example elimination of electric noise, amplification, A/D conversion and the like. The memory 42 stores a control program to control elements in the lens unit 12. The controller 40 runs the control program and controls the elements. The controller 40 is connected with the main body controller 30 by the transmission/reception unit 45 and the contacts 16a and 36, and controlled by the main body controller 30.

The RFID tag reader 43 for wireless reception reads the accessory type data from the RFID tag 50 in the conversion lens device 13. The RFID tag reader 43 has the tag reader coil 31. The tag reader coil 31 includes an electromagnetic coil 31a and a receiver coil 31b. The electromagnetic coil 31a generates electromotive force in the RFID tag 50. The receiver coil 31b receives the accessory type data output by the RFID tag coil 28 in the RFID tag 50 wirelessly. The coils 31a and 31b extend on the cylindrical shape of the lens unit 12 and outside the photographing lens 14.

The determiner 44 stores a reference data table for data of propriety with plural accessory devices, and evaluates the obtained accessory type data from the RFID tag reader 43 by referring to the data table, to check propriety of the lens unit 12. If no adjustment of focus is possible even upon setting the conversion lens device 13, then a result of the check is impropriety.

The transmission/reception unit 45 is controlled by the controller 40, and transmits data to and receives data from the main body 11. After the accessory device is found appropriate for the lens unit 12 by the determiner 44, then data of the propriety as a result is transmitted by the transmission/reception unit 45 to the main body 11.

Electric arrangement of the conversion lens device 13 is described now. The RFID tag 50 is included in the conversion lens device 13. The RFID tag 50 includes a data storage region 51, the RFID tag coil 28 and a control region 52. The data storage region 51 stores accessory type data associated with the conversion lens device 13. The RFID tag coil 28 wirelessly outputs a radio wave of the accessory type data in the data storage region 51. The control region 52 reads the accessory type data from the data storage region 51, and causes the RFID tag coil 28 to transmit the accessory type data to the exterior. Elements including the data storage region 51, the RFID tag coil 28 and the control region 52 are arranged around the lens element. The RFID tag coil 28 is formed to extend on the peripheral form of the conversion lens device 13. Note that any of various suitable types of the RFID tag 50 may be used, for example, μ-Chip (trade name, manufactured by Hitachi Ltd.) having a size of 0.4 mm and including an antenna.

When the conversion lens device 13 comes near to the lens unit 12 prior to attachment to the lens unit 12, a radio wave is emitted by the electromagnetic coil 31a, to generate electromotive force in the RFID tag coil 28 by electromagnetic induction. The RFID tag 50 is driven by the electromotive force. Accessory type data is wirelessly output by the RFID tag coil 28. The receiver coil 31b of the RFID tag reader 43 receives the accessory type data.

Figure 3:
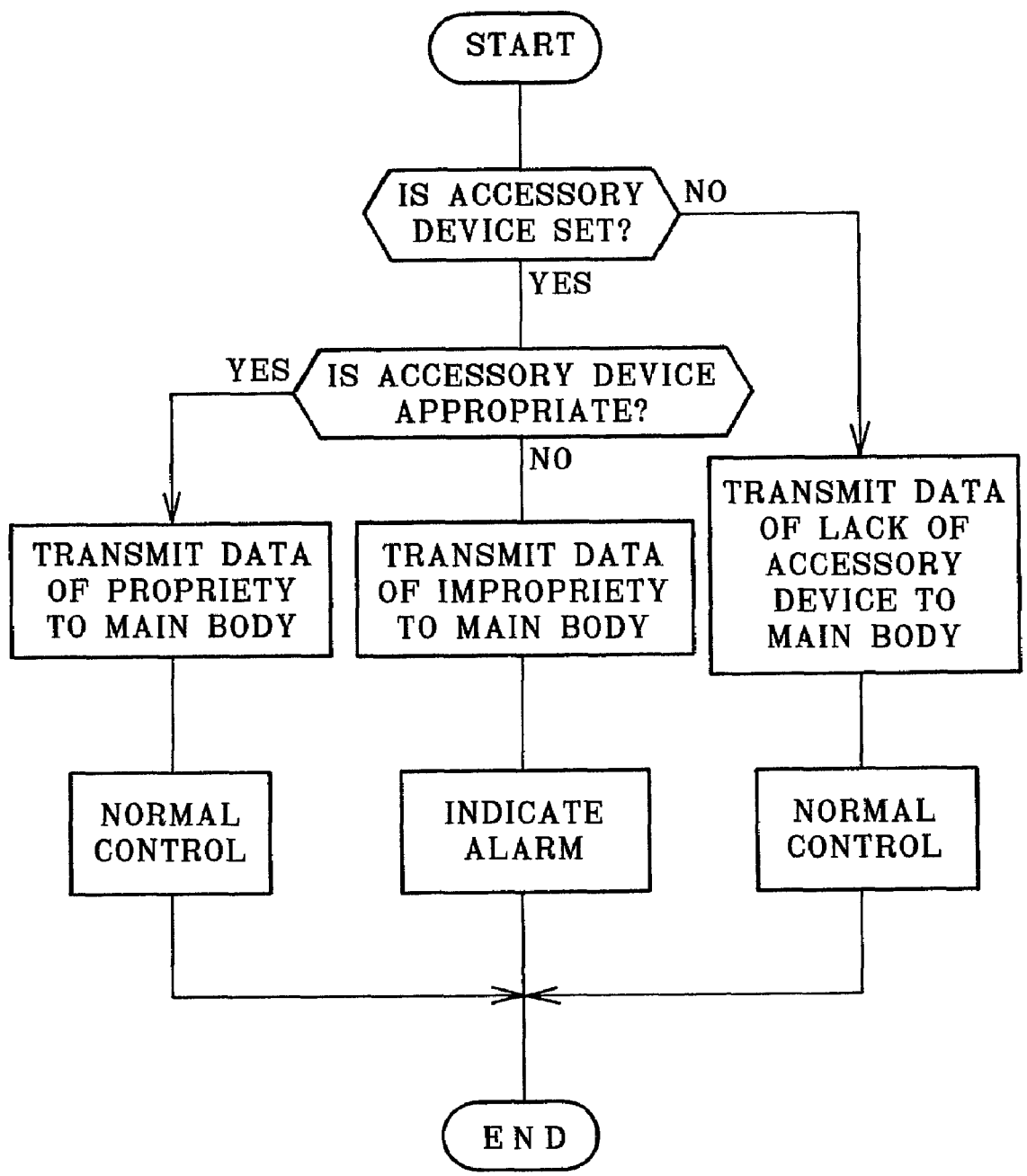
FIG. 3 is a flow chart illustrating checking of propriety in the camera system.

The operation of the camera system 10 is described with reference to FIG. 3. When the lens unit 12 is set on the main body 11, at first the controller 40 checks as to whether the conversion lens device 13 is set or not. To this end, whether the accessory type data is received or not is checked by use of the RFID tag reader 43.

If no conversion lens device 13 is found by the controller 40, then the controller 40 causes the transmission/reception unit 45 to transmit data of lack of the accessory device to the main body 11 through the contacts 16a and 36. The main body controller 30 causes the transmission/reception unit 38 to receive the data, and controls the operation of photography normally.

If the conversion lens device 13 is found set on the lens unit 12, then the determiner 44 evaluates the received accessory type data and checks propriety of the conversion lens device 13. If lack of the propriety is determined by the determiner 44, then the controller 40 controls the transmission/reception unit 45 to send data of the lack of the propriety to the main body 11.

When the transmission/reception unit 38 at the main body controller 30 receives the data of being not appropriate, then the main body controller 30 causes the LCD 33 to display a warning message of impropriety between the lens unit 12 and the conversion lens device 13. Note that other messages may be indicated besides the warning message, for example, a message that restriction will occur in the performance of photographing.

If the conversion lens device 13 is found appropriate, then the controller 40 causes the transmission/reception unit 45 to transmit data of being appropriate to the main body 11. After this, the main body controller 30, upon receiving the data of being appropriate at the transmission/reception unit 38, allows the camera system to photograph an image normally without restriction.

Despite the present embodiment, an accessory device of the invention may be other than the conversion lens device 13, for example, an electronic flash device. The flash device can be a type settable on the lens unit 12, or may be a type settable on the main body 11.

The first embodiment has been described heretofore, the propriety being checked between the accessory device and the lens unit 12. Another preferred embodiment is now described, in which propriety is checked between the accessory device, the lens unit 12 and the main body 11.

Figure 4:
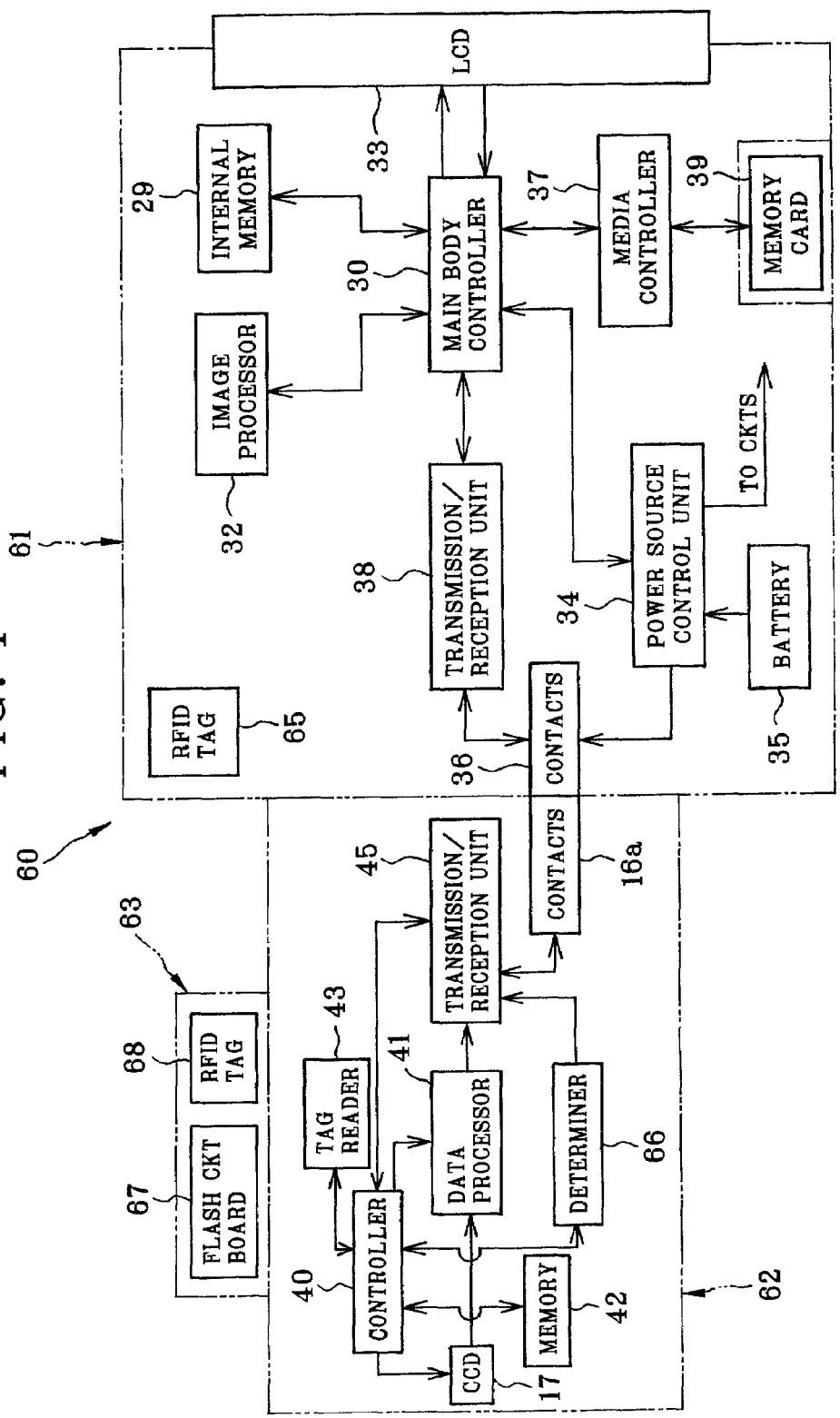
FIG. 4 is a block diagram illustrating another preferred camera system with a flash device.

In FIG. 4, a camera system 60 includes a camera main body 61 and a lens unit 62. The lens unit 62 is removably fitted on the main body 61 in a similar manner to the camera system 10. A flash device 63 as accessory device or attachment is set on the outside of the lens unit 62 removably.

An RFID tag or IC tag 65 is incorporated in the main body 61. Camera main body type data particularly associated with the main body 61 is stored in the RFID tag 65. As the RFID tag 65 is structurally the same as the RFID tag 50, no further description is added. Also, the main body 61 is structurally the same as the main body 11. Elements similar to those of the above embodiments are designated with identical reference numerals.

Unlike the lens unit 12, a determiner 66 is incorporated in the lens unit 62 in a manner in place of the determiner 44. Elements similar to those of the lens unit 12 are referred to with reference numerals.

The flash device 63 includes a flash circuit board 67 and an RFID tag or IC tag 68. The RFID tag 68 has a data storage region which stores the accessory type data assigned to the flash device 63 as type data.

The RFID tag reader 43 in the lens unit 62 receives the camera main body type data from the RFID tag 65, and receives accessory type data from the RFID tag 68. A reference data table is stored in the determiner 66 and is information of propriety of the accessory device and the main body 61. The determiner 66 evaluates propriety between the main body 61, the lens unit 62 and the flash device 63 by referring to the reference data table, camera main body type data and accessory type data.

Figure 5:
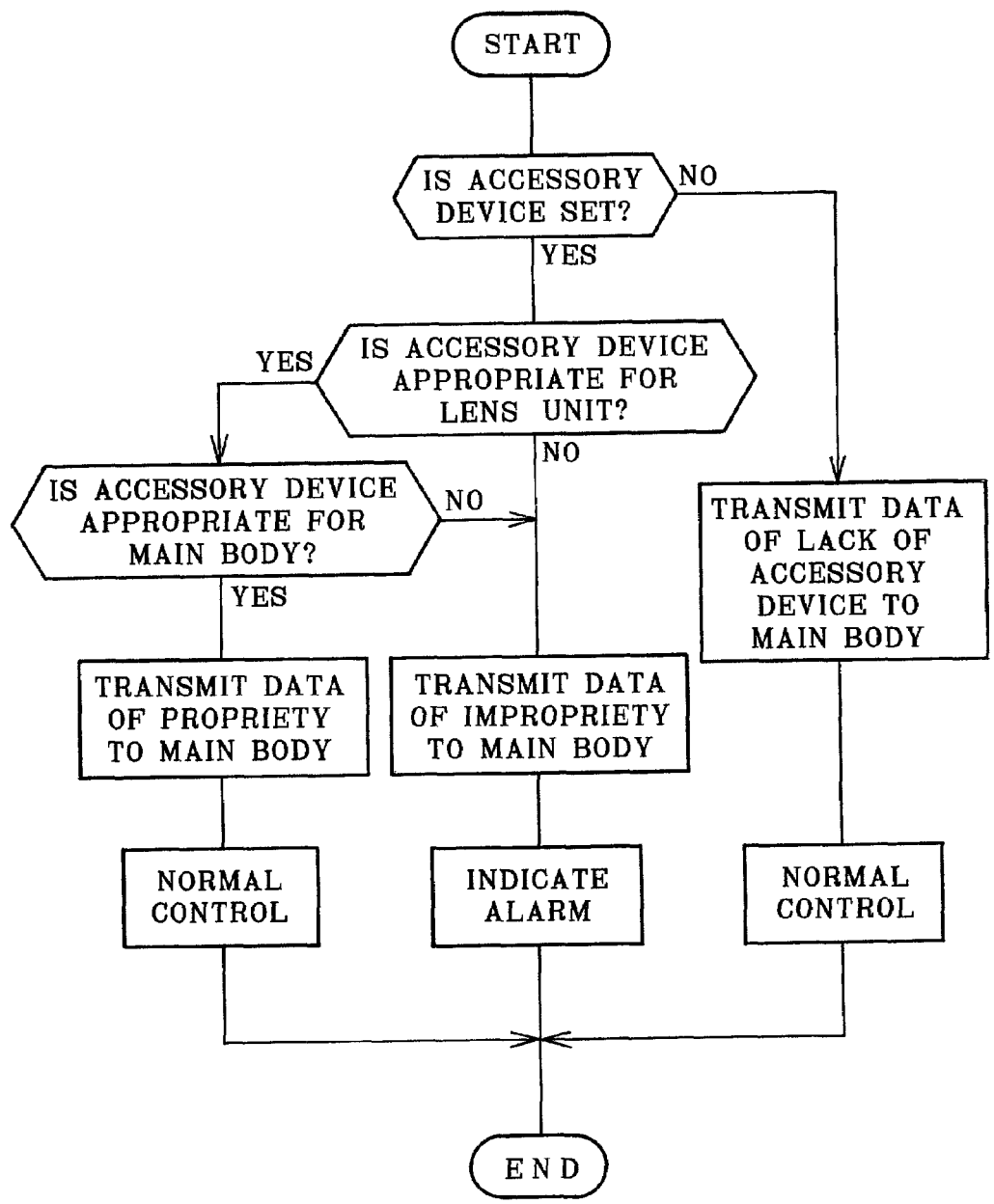
FIG. 5 is a flow chart illustrating checking of propriety in the camera system.

The operation of the camera system 60 is described by referring to FIG. 5. When the lens unit 62 is set on the main body 61, the controller 40 checks whether the flash device 63 is set or not. To this end, whether the accessory type data is received or not is checked by use of the RFID tag reader 43.

When no flash device 63 is found by the controller 40, then the controller 40 causes the transmission/reception unit 45 to transmit data of lack of the accessory device to the main body 61 through the contacts 16a and 36. The transmission/reception unit 38 at the main body controller 30 receives the data, before normal control of operation.

If the flash device 63 is found set on the main body 61, then the determiner 66 checks whether the flash device 63 is appropriate for the lens unit 62 according to the accessory type data being received.

If impropriety with the lens unit 62 is found, the controller 40 causes the transmission/reception unit 45 to transmit data of impropriety to the main body 61. The main body controller 30, upon receipt of the data of impropriety at the transmission/reception unit 38, causes the LCD 33 to indicate a warning message of impropriety between the lens unit 62 and the flash device 63.

A message of restricting performance of photography can be displayed without warning message. For example, it is possible to allow photography even when the flash device 63 is found not appropriate, with restriction in the zooming. This is for preventing lens vignetting when the lens unit 62 is zoomed to the forward position. Also, it is possible automatically to preflash for photographing even the flash device 63 is found not appropriate. This is to prevent red-eye phenomena in the combined use of the lens unit 62 and the flash device 63. In relation to the flash device 63, it is possible for the transmission/reception unit 45 to transmit control information of the flash device 63 to the main body 61 together with the data of impropriety.

If the flash device 63 is found appropriate for the lens unit 62, then the determiner 66 evaluates the camera main body type data and the lens unit type data, and checks as to propriety of the flash device 63 with the main body 61.

If the flash device 63 is found not appropriate for the main body 61, then the data of the impropriety is transmitted to the main body 61. Upon receiving this, the main body controller 30 causes the LCD 33 to display a warning message of impropriety between the main body 61 and the flash device 63. Note that other messages may be indicated besides the warning message, for example, a message that restriction will occur in the performance of photographing.

If the flash device 63 is found appropriate for the main body 61, then the controller 40 causes the transmission/reception unit 45 to transmit the data of the propriety to the main body 61. Then the main body controller 30, upon receiving the data of being appropriate at the transmission/reception unit 38, allows the camera system to photograph an image normally without restriction.

In the above embodiments, the accessory device is fitted on the lens unit. However, an accessory device of the invention can be loaded on the camera body. Furthermore, accessory devices may be electrically movable tilting heads, outer monitor display or the like in addition to the conversion lens device 13 or the flash device 63.

An accessory device may be removably connected between the lens unit and the main body 61. An embodiment in which propriety is checked by a determiner in an accessory device is hereinafter described.

Figure 6:
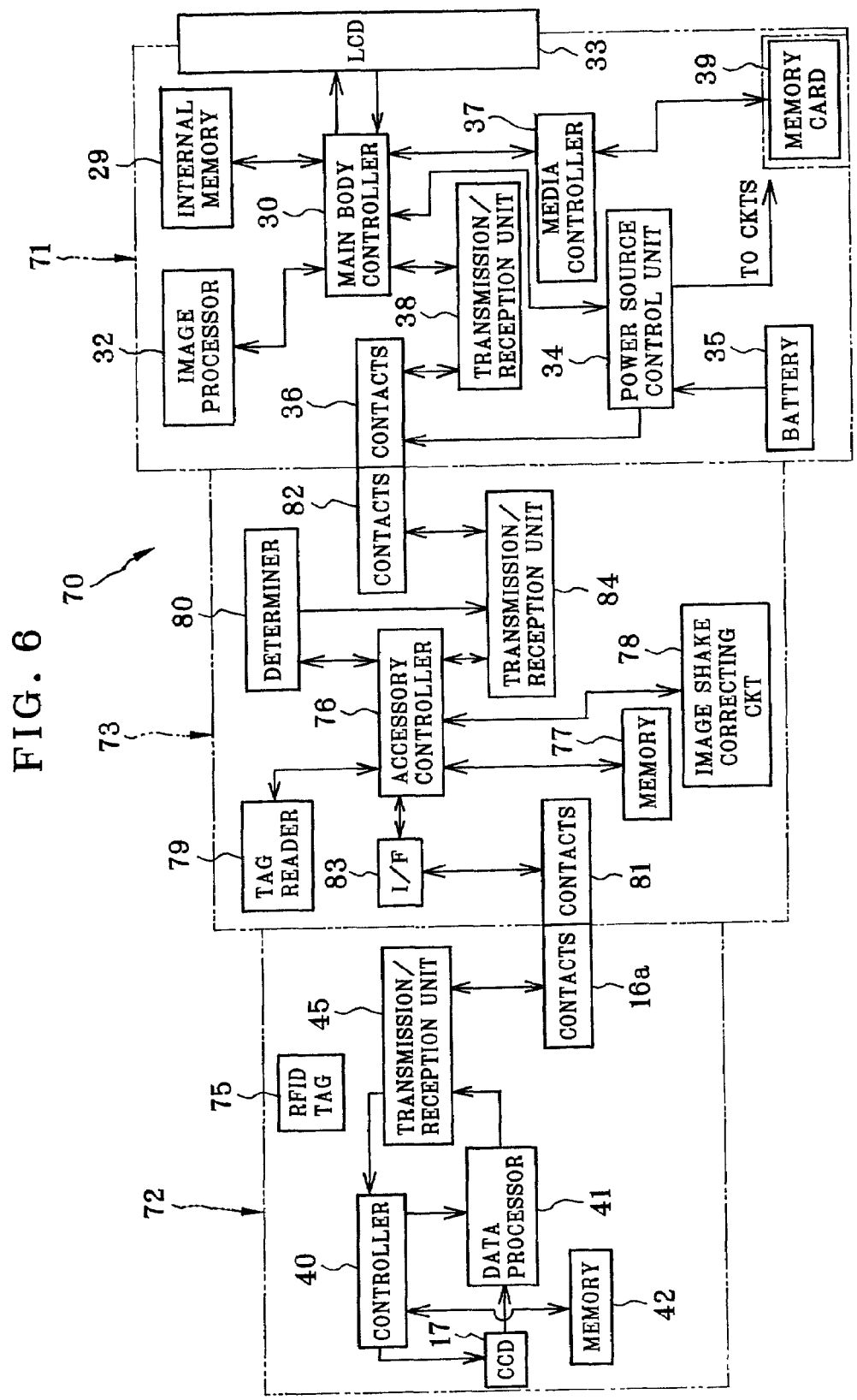
FIG. 6 is a block diagram illustrating one preferred camera system with an image shake correcting device.

In FIG. 6, another preferred camera system 70 is depicted, and includes a camera main body 71 and a lens unit 72. An image shake correcting device or module 73 as accessory device or attachment is removably secured between the main body 71 and the lens unit 72.

The main body 71 is structurally the same as the main body 11. The lens unit 72 does not have the determiner 44 as included in the lens unit 12. An RFID tag or IC tag 75 is incorporated in the lens unit 72. Lens unit type data is stored in the RFID tag 75 for a lens unit type of the lens unit 72. The RFID tag 75 is structurally the same as the RFID tag 50.

The image shake correcting device 73 includes an accessory controller 76, a memory 77, an image shake correcting circuit 78, an RFID tag reader 79 as first reception unit, a determiner 80, communication contacts 81 and 82, a communication interface 83 as transmission/reception unit, and a transmission/reception unit 84 or communication interface. The accessory controller 76 controls various elements in the image shake correcting device 73.

A control program is stored in the memory 77 for control of elements in the image shake correcting device 73. The accessory controller 76 controls according to the control program read from the memory 77.

The image shake correcting circuit 78 subjects image data from the lens unit 72 to image shake correction. Also, the RFID tag reader 79 as an interface for reception receives the lens unit type data from the RFID tag 75 in the lens unit 72.

A reference data table is stored in the determiner 80 for propriety of plural lens units. The determiner 80 evaluates the lens unit type data received by the RFID tag reader 79 with the reference data table, so propriety between the lens unit 72 and the image shake correcting device 73 is evaluated.

The contacts 81 connect with the contacts 16a when the image shake correcting device 73 is loaded with the lens unit 72. The contacts 82 connect with the contacts 36 when the main body 71 is loaded with the image shake correcting device 73.

The accessory controller 76 controls the communication interface 83 for transmitting and receiving data between the lens unit 72 and the image shake correcting device 73. The accessory controller 76 controls the transmission/reception unit 84 for transmitting and receiving data between the main body 71 and the image shake correcting device 73.

Figure 7:
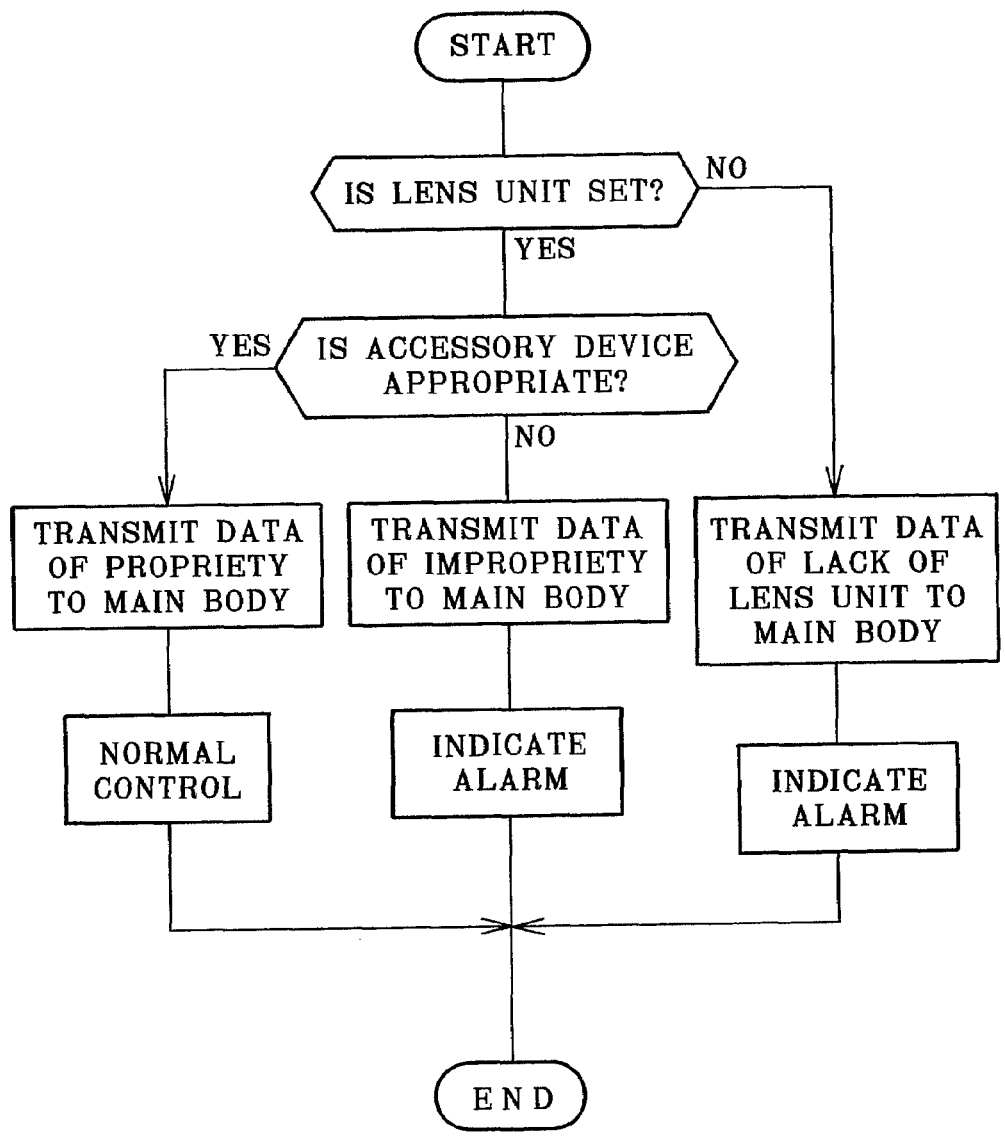
FIG. 7 is a flow chart illustrating checking of propriety in the camera system.

A flow in FIG. 7 is referred to now, to describe operation of the camera system 70. When the image shake correcting device 73 is set on the main body 71, the accessory controller 76 checks existence or lack of setting of the lens unit 72. To this end, reception or lack of reception of the lens unit type data is checked according to the RFID tag reader 79.

If no lens unit 72 is found loaded, then the accessory controller 76 causes the transmission/reception unit 84 to transmit data of lack of the lens unit to the main body 11 through the contacts 82 and 36. The main body controller 30, upon reception of the data with the transmission/reception unit 84, drives the LCD 33 to display a warning message to encourage setting of the lens unit 72.

If the lens unit 72 is found loaded, then the determiner 80 checks propriety between the lens unit 72 and the image shake correcting device 73 according to the lens unit type data received by the RFID tag reader 79.

If impropriety is found between the lens unit 72 and the image shake correcting device 73, then the accessory controller 76 causes the transmission/reception unit 84 to transmit data of the impropriety to the main body 71. The transmission/reception unit 38 at the main body controller 30 receives the data of the impropriety, so the main body controller 30 drives the LCD 33 to display a warning message of impropriety between the lens unit 72 and the image shake correcting device 73. Also, a message of restricting performance of photography can be displayed without a warning message.

If the lens unit 72 is found appropriate for the image shake correcting device 73, then the accessory controller 76 causes the transmission/reception unit 84 to transmit the data of being appropriate to the main body 71. Then the main body controller 30, upon receiving the data of being appropriate at the transmission/reception unit 38, allows the camera system to photograph an image normally without restriction.

In the above embodiment, propriety between the lens unit and the accessory device is checked. However, another preferred embodiment has a determiner which checks propriety between a lens unit, an accessory device, and a camera main body.

Figure 8:
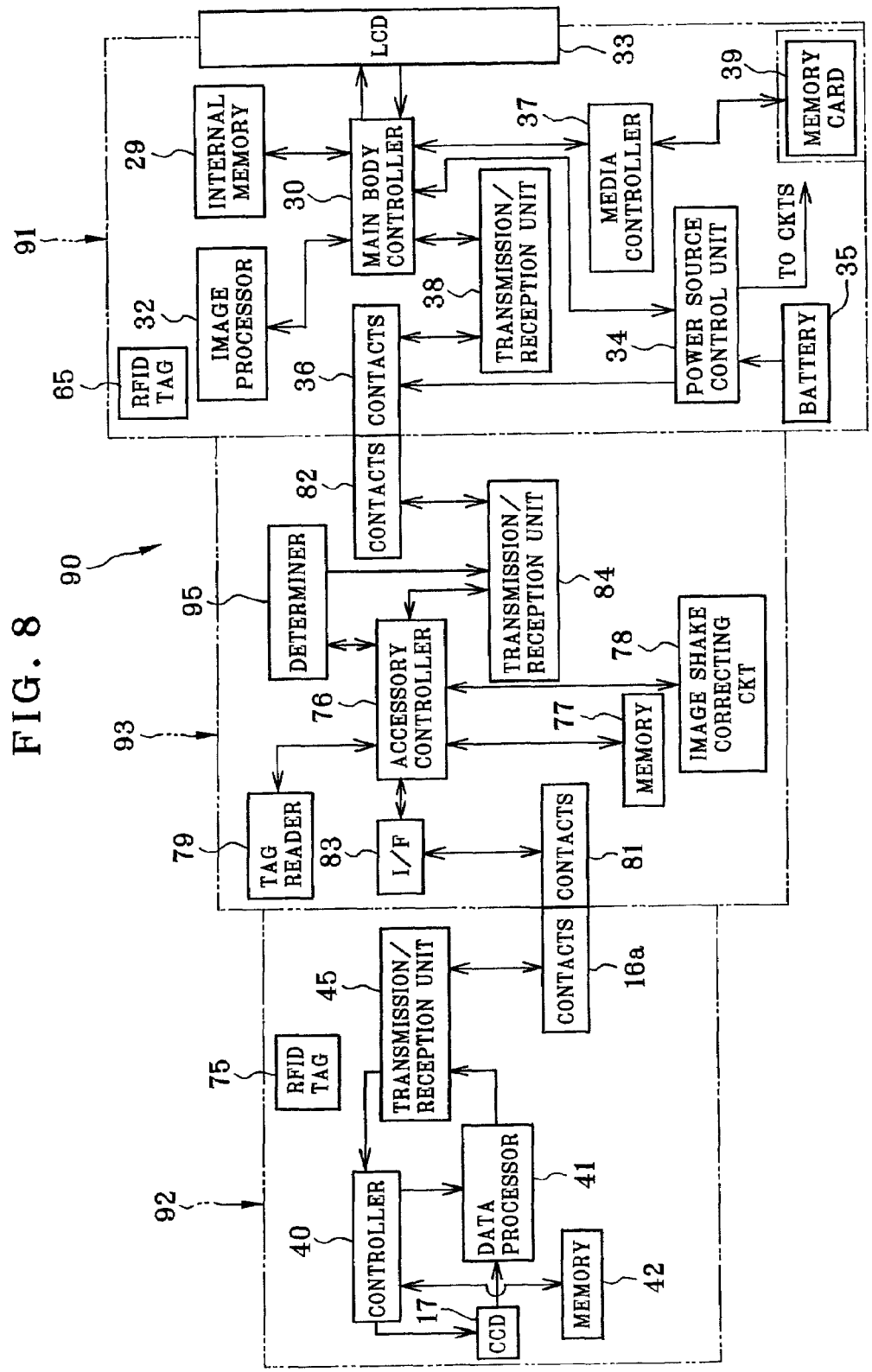
FIG. 8 is a block diagram illustrating still another preferred camera system in which a second RFID tag is added.

In FIG. 8, still another preferred camera system 90 is illustrated, and includes a camera main body 91 and a lens unit 92. An image shake correcting device or module 93 as accessory device or attachment is fitted between the main body 91 and the lens unit 92 in a removable manner.

The main body 91 is structurally the same as the main body 71. Elements similar to those of the above embodiments are designated with identical reference numerals. The lens unit 92 is structurally the same as the lens unit 72. See the description above.

A determiner 95 is included in the communication interface 83 unlike the determiner 80 in the image shake correcting device 73. A reference data table is stored in the determiner 95 for propriety between the lens unit and the camera main body. When the RFID tag reader 79 receives the lens unit type data and the camera main body type data, the RFID tag reader 79 refers to the data table, to check propriety between the lens unit 92, the image shake correcting device 93 and the main body 91. For remaining portions, the image shake correcting device 93 has a similar structure to that of the image shake correcting device 73. Elements similar to those of the above embodiment are designated with identical reference numerals.

Figure 9:
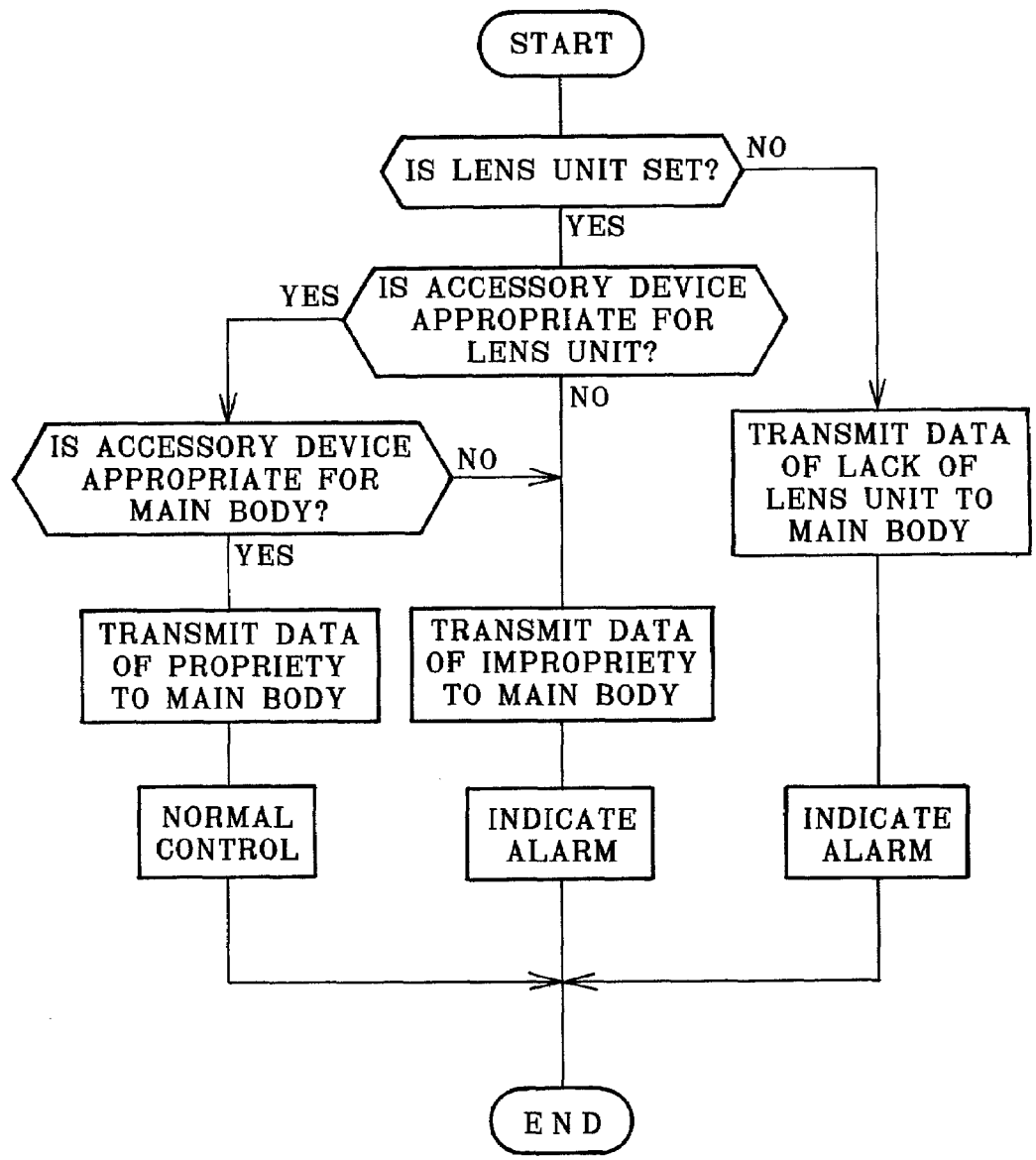
FIG. 9 is a flow chart illustrating checking of propriety in the camera system.

The operation of the camera system 90 is described by referring to the flow in FIG. 9. When the main body 91 is loaded with the image shake correcting device 93, the accessory controller 76 checks existence or lack of the lens unit 92 on the image shake correcting device 93. To this end, it is determined whether lens unit type data is received or not by the RFID tag reader 79.

If no setting of the lens unit 92 is found, then the accessory controller 76 causes the transmission/reception unit 84 to transmit data of lack of the lens unit 92 to the main body 91 by use of the contacts 36 and 82. When the main body controller 30 receives the data of the lack of the lens unit 92, then the main body controller 30 drives the LCD 33 to display a warning message for encouraging setting of the lens unit 92.

If the lens unit 92 is found loaded, then the determiner 95 evaluates the lens unit type data from the RFID tag reader 79 by referring to the reference data table, to check propriety between the lens unit 92 and the image shake correcting device 93.

If the lens unit 92 is found not appropriate for the image shake correcting device 93, then the accessory controller 76 causes the transmission/reception unit 84 to transmit data of impropriety to the main body 91. The main body controller 30, upon receiving the data of the impropriety at the transmission/reception unit 38, drives the LCD 33 to display the warning message that the lens unit 92 is not appropriate for the image shake correcting device 93. Note that other messages may be indicated besides the warning message, for example, a message that restriction will occur in the performance of photographing.

If the lens unit 92 is found appropriate for the image shake correcting device 93, the determiner 95 evaluates the camera main body type data from the RFID tag reader 79 accessing the RFID tag 65 and the reference data table, to check propriety between the main body 91 and the image shake correcting device 93.

If the image shake correcting device 93 is found not appropriate for the main body 91, then the accessory controller 76 causes the transmission/reception unit 84 to transmit data of no propriety to the main body 91. The main body controller 30, upon receiving the data, drives the LCD 33 to display a warning message of impropriety between the main body 91 and the image shake correcting device 93. Also, other messages may be indicated besides the warning message, for example, a message that restriction will occur in the performance of photographing.

If the image shake correcting device 93 is found appropriate for the main body 91, the accessory controller 76 causes the transmission/reception unit 84 to transmit data of propriety to the main body 91. The main body controller 30, upon receiving the data of propriety, controls for operation of the lens unit 92 and the image shake correcting device 93.

In the present and above embodiments, the accessory device is the image shake correcting device 93. However, any of various examples may be combined as an accessory device, such as an HDD unit, a stereo unit and the like. Also, the lens unit 92 can be a type without a CCD. An accessory device may be a conversion lens device or other optical attachment.

In the above embodiment, a radio wave is used for wireless communication of data between RFID tags. However, data can be transmitted and received on line by use of signal lines connecting interfaces.

An image pickup element or photographing device for use in the invention may be any type other than CCD, for example, a CMOS image sensor.

Although the lens unit of the above embodiments includes the image pickup element, a lens unit of the invention may be an interchangeable lens without the image pickup element. Furthermore, a camera of the invention may be a camera distinct from a digital still camera, for example, can be a video camera, a camera for use with silver halide photo film, and also a camera for a specific use.

According to the preferred embodiments, propriety of setting the accessory device, lens unit, and camera main body is determined according to types. However, serial numbers of accessory device, lens unit, and camera main body may be used for determining propriety of those being set, because originally predetermined to include information of their types. Although the accessory type data, lens unit type data, and camera main body type data are used in the above embodiments, yet accessory device data, lens unit data, and camera main body data according to the invention may be serial number data of accessory device, lens unit, and camera main body.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera system including a lens unit having a photographing lens, a camera main body on which said lens unit is secured removably, and an accessory device secured between said main body and said lens unit, said camera system comprising:
   (A) said accessory device including:
      a first reception unit for receiving lens unit data from said lens unit;
      a determiner for checking whether said lens unit is appropriate according to lens unit data received by said first reception unit, and for producing checking information; and
      a transmission unit for transmitting said checking information;
   (B) said main body including a second reception unit for receiving said checking information from said accessory device.

2. A camera system as defined in claim 1, wherein said main body includes:
   an alarm device for outputting alarm information; and
   a main body controller for driving said alarm device if said checking information represents that said accessory device is inappropriate.

3. A camera system as defined in claim 2, wherein said second reception unit is connected with said transmission unit by connection between contacts, and detects whether said accessory device is set on said main body.

4. A camera system as defined in claim 3, wherein said alarm device includes a display panel for visibly outputting said alarm information.

5. A camera system as defined in claim 1, wherein said first reception unit further receives camera main body data from said main body;
   said determiner checks whether a combination of said lens unit, said accessory device and said main body is appropriate.

6. A camera system as defined in claim 1, wherein said lens unit includes a first RFID tag for storing said lens unit data; said first reception unit includes an RFID tag reader for wireless reception.

7. A camera system as defined in claim 6, wherein said main body includes a second RFID tag for storing camera main body data;
   said RFID tag reader further reads said main body data from said second RFID tag.

8. A camera system as defined in claim 6, wherein said lens unit includes a first communication contact;
   said accessory device includes a second communication contact, connected with said first communication contact by securing said lens unit, for detecting whether said lens unit is set.

9. A camera system as defined in claim 1, wherein said lens unit further includes an image pickup element for photographing an object image by receiving light from said photographing lens.

10. A camera system as defined in claim 1, wherein said accessory device is an image shake correcting device.

11. An accessory device for being secured between a camera main body and a lens unit having a photographing lens and being secured to said main body removably, said accessory device comprising:
    a reception unit for receiving lens unit data from said lens unit;
    a determiner for checking whether said lens unit is appropriate according to lens unit data received by said reception unit, and for producing checking information; and
    a transmission unit for transmitting said checking information to said main body.

12. An accessory device as defined in claim 11, wherein said lens unit includes an RFID tag for storing said lens unit data;
    said reception unit includes an RFID tag reader for wireless reception.

* * * * *